United States Patent [19]

Lockhart

[11] Patent Number: 5,584,432
[45] Date of Patent: Dec. 17, 1996

[54] ANTI-SCALD VALVE WITH SHAPE MEMORY ALLOY ACTUATOR

[76] Inventor: Robert J. Lockhart, 164 Winthrop Rd., Deep River, Conn. 06417

[21] Appl. No.: 434,594

[22] Filed: May 4, 1995

[51] Int. Cl.[6] ................................................ G05D 23/00
[52] U.S. Cl. .................... 236/93 B; 236/87; 236/101 R
[58] Field of Search ........................... 236/93 R, 93 B, 236/80 R, 48 R, 101 E, 101 R, 87

[56] References Cited

U.S. PATENT DOCUMENTS

3,263,926  8/1966  Couffer et al. ..................... 236/93 B
4,778,104  10/1988  Fisher ................................. 236/93 B Primary Examiner—John M. Sollecito
Attorney, Agent, or Firm—Bachman & LaPointe, P.C.

[57] ABSTRACT

An anti-scald valve including a housing including a fluid flow inlet end and a fluid flow outlet end. A first valve component and a second valve component positioned in the housing between the inlet end and the outlet end. At least one of the first valve component and the second valve component allow fluid flow therethrough, wherein the first valve component includes a first surface for sealably mating with a second surface of the second valve component for cutting off fluid flow at a fluid temperature falling within a predetermined fluid temperature range. At least one of the first valve component and the second valve component is substantially flexible at a component temperature below the predetermined fluid temperature range for allowing fluid flow thereover and wherein at least one of the first valve component and the second valve component includes stiffens when said component temperature falls within the predetermined fluid temperature range for moving the first surface and the second surface into a mating position, which substantially cuts off the fluid flow.

21 Claims, 7 Drawing Sheets

ANTI-SCALD VALVE WITH SHAPE MEMORY ALLOY ACTUATOR

BACKGROUND OF THE INVENTION

This invention is directed to anti-scald valves, and more particularly, anti-scald valves using a temperature responsive member for shutting of water flow at potentially harmful temperatures.

The prior art includes a variety of anti-scald valves directed to the prevention of burns via cutting of water flow at water temperatures which may be harmful to human tissue. As can be seen from the following descriptions, the prior art valves are generally complex in design and accordingly expensive to manufacture.

U.S. Pat. No. 4,262,844 to SeKiya discloses a control valve. The valve includes an inlet port 53 in communication with an outlet port 42 with a temperature responsive deflectable partition positioned therebetween. The partition is substantially ring-shaped having a portion of the inlet extending into a center hole therein. The partition extends above the outlet which comprises a plurality of radially extending grooves and a central hole. The central hole is in direct alignment with the inlet and the plurality of radially extending grooves are spaced in a circular formation around the central groove. The partition predetermined temperature for covering the circumferentially spaced radially extending grooves for substantially cutting off fluid flow through the valve. The specific structure of the valve, particularly the operation of the fluid flow closing partition, limits the partition, to being formed from a deflecting type temperature responsive material.

U.S. Pat. No. 5,259,554 to Ewing et al. discloses a shape memory effect actuated diaphragmatic anti-scald valve. The valve includes a shape memory effect leaf spring 36 supported in a slot (not shown) in a housing 15 and which passes into a slot 38 provided in pilot valve 40. A spring 44 is positioned in the valve 40 and provides a counteractive force against the leaf spring 36. Below a predetermined temperature, the leaf spring 36 is overcome by the force of spring 44 and the pilot valve is in the closed position as shown in FIG. 1, thereby allowing fluid flow through slot 17 of bore 19. As the temperature reaches a predetermined value, leaf spring 36 stiffens and returns to its flat position, overcoming the opposing force of spring 44. Accordingly, the pilot valve opens and unseats valve element 42 from the upper valve seat 23 to permit water flow through slots 25 in orifice 34 such that only a small amount of water continues to flow. Accordingly, while a stiffening shape memory element is incorporated, it is used to overcome a spring force which allows the main avenue of flow of the fluid through the valve to be cut off. In Ewing et al., the shape memory element is not directly linked with an element used to cause water flow cut-off.

U.S. Pat. No. 4,809,947 to Muntwyler discloses a flow regulation valve. The valve includes a heat responsive extension element 8 which extends substantially perpendicular to a gas line. The extension element 8 has a valve body 14 fastened to the center thereof and functions to maintain the valve body 14 against the valve seat 17 when the extension is not thermally activated. The extension element 8 is fastened on each end to covers 7 which are adapted to connect a current source which serves as a heating source for the extension 8. Upon heating the extension element 8 via the current, slight deflection of the extension element 8 occurs and thermal length variation of the extension element is transformed into an approximately 100-fold stroke of the valve body 14 relative to the valve seat 17. For this valve, the valve is closed during non-heated use; the extension is not a shape memory element but simply a strip of metal; and changes in valve position and fluid flow is not accomplished via stiffening but is accomplished by expansion.

In addition to the above patents, U.S. Pat. No. 4,402,455 to Kolt disclosing an automatic fluid control assembly; U.S. Pat. No. 4,480,780 to Bennett disclosing hot water cut-off safety valve for showers; U.S. Pat. No. 5,123,593 to Rundle disclosing a manual override heat sensitive valve; U.S. Pat. No. 4,778,104 to Fisher disclosing a temperature responsive line valve; and U.S. Pat. No. 3,450,344 to O'Brien disclosing a thermostatic valve for controlling the flow of fluids. Each represent valves having temperature responsive elements therein for effecting fluid flow. However, each of these valves are more complex than the valve of the instant invention and accordingly are less economically feasible than the valve of the present invention.

There exists, therefore, a need for a temperature responsive fluid flow valve for preventing scalding having a simple and economical design which safely cuts off fluid flow and which saves energy, which can be used in fluid flow applications such as, for example, with faucets and shower heads.

SUMMARY OF THE INVENTION

The primary object of this invention is to provide an anti-scald valve having a simple design, which is economical to manufacture and saves energy.

Another object of this invention is to provide an anti-scald valve which includes an element which is highly sensitive and responsive to a predetermined potentially harmful temperature so as to cut-off fluid flow upon reaching this temperature.

Still another object of this invention is to provide an anti-scald valve incorporating a shape memory element for cutting off water flow upon detection of a potentially harmful fluid temperature.

Yet another object of this invention is to provide an anti-scald valve which is easily adaptable for use with existing faucets or shower heads.

The foregoing objects are obtained by the anti-scald valve of the present invention which includes a housing including a fluid flow inlet end and a fluid flow outlet end. A first valve component and a second valve component are positioned in the housing between the inlet end and the outlet end. At least one of the first valve component and the second valve component allow fluid flow therethrough, wherein the first valve component including a first surface for sealably mating with a second surface of the second valve component for cutting off fluid flow at a fluid temperature falling within a predetermined fluid temperature range. At least one of the first valve component and the second valve component is substantially flexible at a component temperature below the predetermined fluid temperature range for allowing fluid flow thereover and wherein at least one of the first valve component and the second valve component includes means for stiffening when said component temperature falls within the predetermined fluid temperature range for moving the first surface and the second surface into a mating position which substantially cuts off the fluid flow.

The details of the present invention are set out in the following description and drawings wherein like reference characteristics depict like elements.

BRIEF DESCRIPTION OF THE DRAWINGS

FIG. 2b is a side view of the male component taken along line 2b—2b of FIG. 2a;

FIG. 3b is a cross sectional view of the a female component taken along line 3b—3b of FIG. 3a;

DETAILED DESCRIPTION OF THE PREFERRED EMBODIMENT

Figure 1:
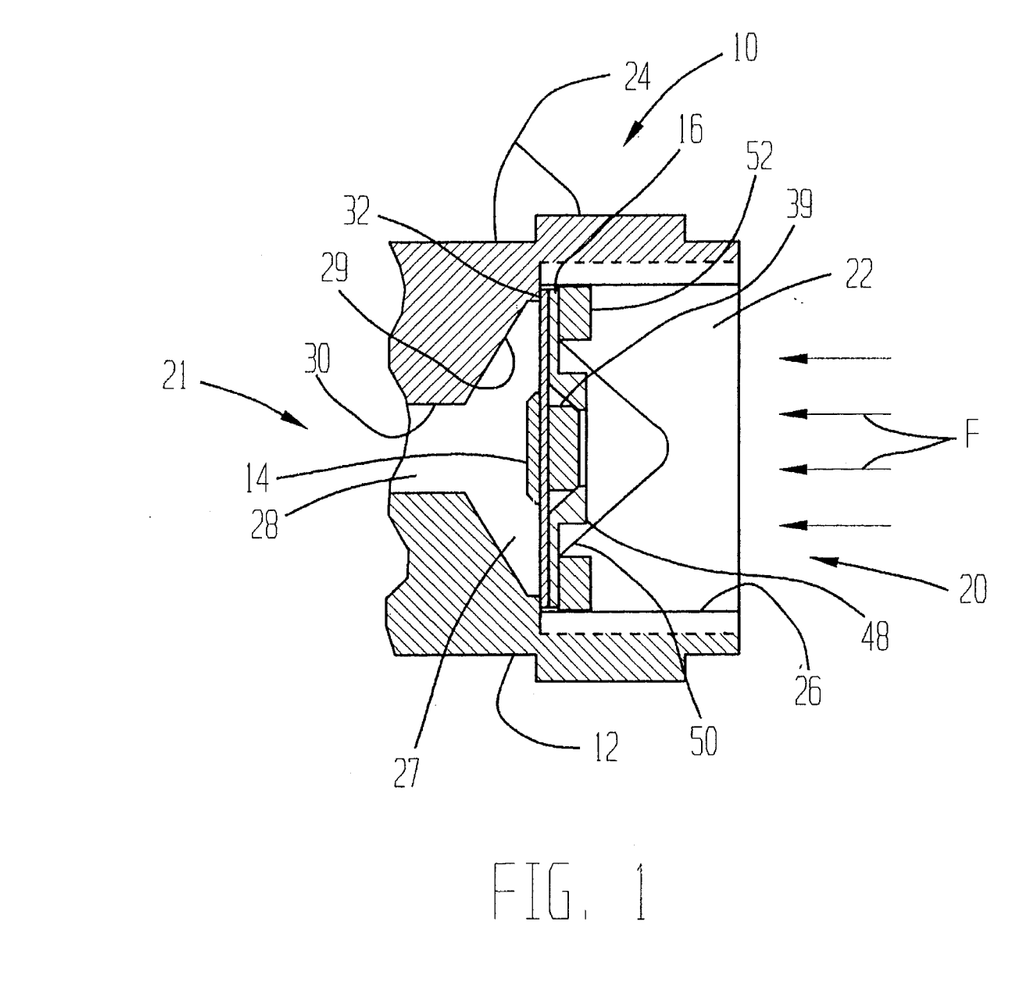
FIG. 1 is a cross-sectional view of the anti-scald valve of the present invention showing the direction of fluid flow.

Referring now to the drawings in detail, there is shown in FIG. 1 a cross-sectional view of the anti-scald valve of the present invention, designated generally as 10. Valve 10 generally includes a housing 12, a male component 14, and a female component 16.

With reference to FIG. 1, the direction of fluid flow F is shown by the arrows. Housing 12 is preferably substantially cylindrical in shape with several different inner surfaces, having an inlet end 20 and an outlet end 21 and a longitudinal axis extending in the direction of fluid flow F. Housing 12 has an outer wall 24 and includes a first bore 22, defined by inner surface 26, which is associated with inlet end 20, a conically shaped intermediate bore 27 defined by an inner surface 29, which leads into a smaller second bore 28 defined by an inner surface 30. Accordingly, first bore 22 and second bore 28 have different diameters. The smaller diameter of conical intermediate bore 27 is equal in diameter to and merges with second bore 28 while the larger diameter of first bore 22 leads into but is smaller than the diameter of first bore 22. Accordingly, a stepped surface 32 separates the conical intermediate and first bores. Male component 14 and female component 16 are positioned in first bore 22.

Male component 14 and female component 16 are preferably supported in first bore 22 via stepped surface 32, as shown in FIG. 1. That is, male component 14 rests against stepped surface 32 and female component 16 is positioned above male component 14, closest to inlet end 22.

Optionally, and in another embodiment an adapter component (not shown) can be used with a valve not having intermediate bore 27. The adapter component has a diameter slightly smaller than the diameter of first bore 22 and sits in first bore 22 against stepped surface similar to surface 32. Adapter component is preferably cylindrical in shape having a wall thickness sufficient for supporting the male and female components on an upper surface thereof and against oncoming fluid under pressure.

Figure 2A:
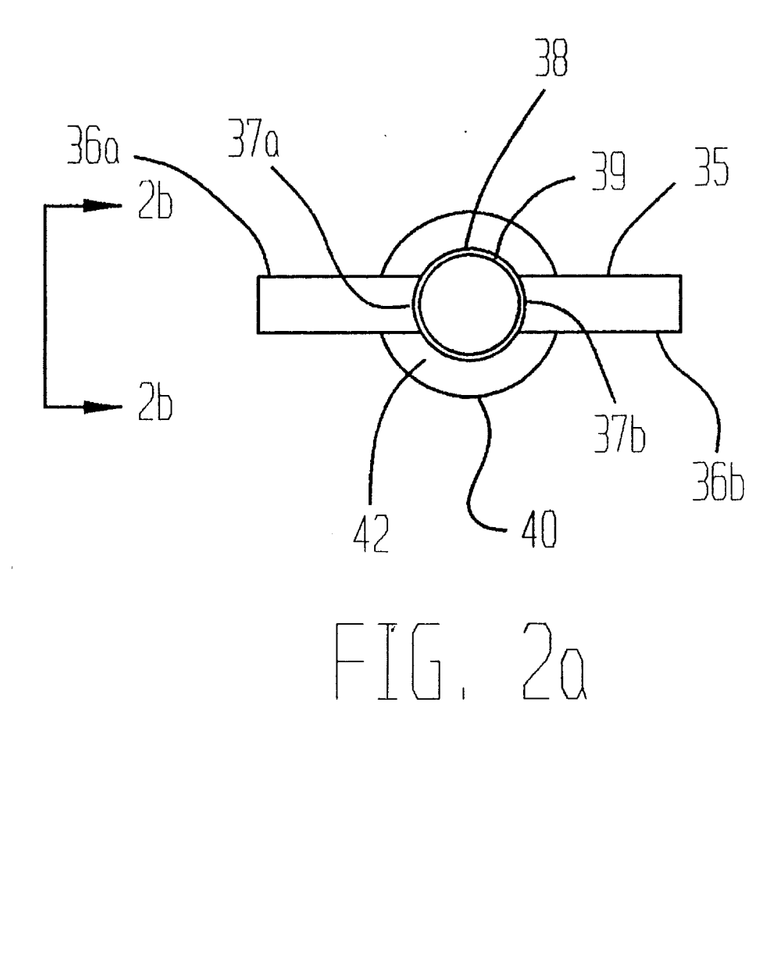
FIG. 2a is a bottom view of a male component of the present invention.
Figure 2B:
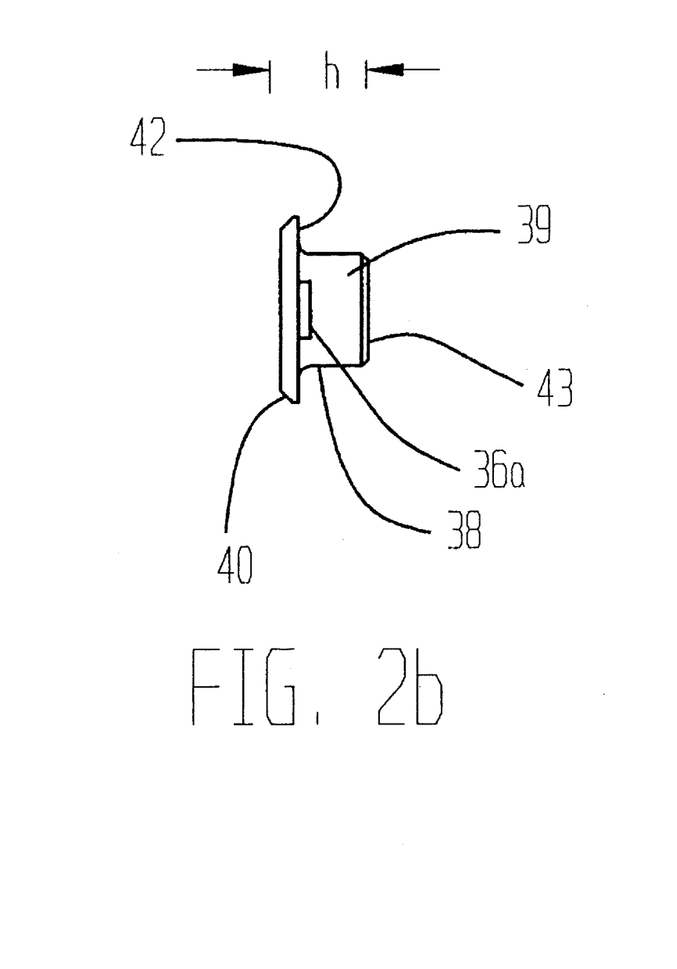
Figure 4:
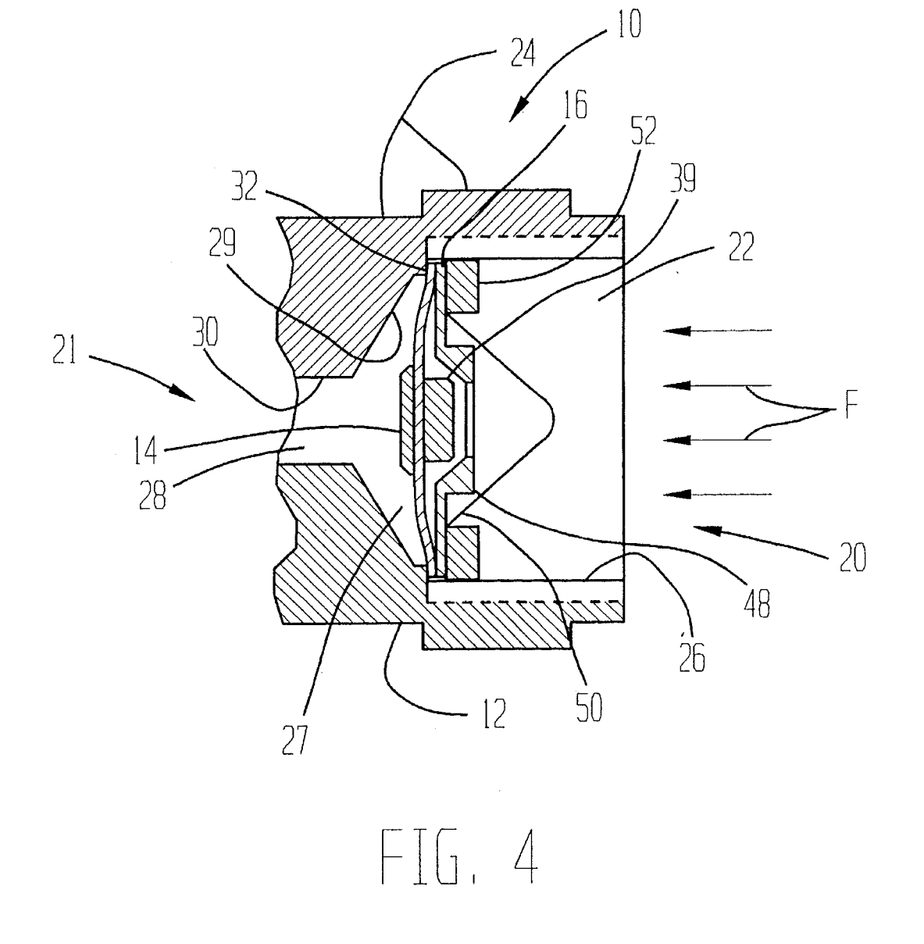
FIG. 4 is a cross-sectional view of the anti-scald valve of FIG. 1 but in a position allowing for fluid flow therethrough.

In the preferred embodiment, male component 14 rests between stepped surface 32 of housing 12 and female component 16. As shown in FIG. 2, male component 14 includes a strip 35 having sections 36a and 36b and a plug 38, forming an actuating member disposed longitudinally in a plane substantially perpendicular to the longitudinal axis of housing 12 while the valve is in a valve closed position, as shown in FIG. 1. Strip 35 including strip sections 36a and 36b are preferably formed via molding into a unitary piece and plug 38 is attached on strip 35 via an additional molding step, whereby plug 38 is preferably molded around strip 35 separating strip 35 into sections 36a and 36b. Plug 38 is positioned between two inner ends 37a and 37b of strip sections 36a and 36b of strip 35, respectively and may be slidable on strip 35. Strip 35 and sections 36a and 36b are substantially rectangular in shape although other shapes can be used. Strip 35 including sections 36a and 36b is formed from a shape memory alloy, preferably nitinol, which is a nickel and titanium alloy comprising approximately 50% of each element. However, other shape memory alloys currently known or later discovered can be used with the valve disclosed herein. The nitinol strip 35 having sections 36a and 36b is preferably preprogrammed through heat treatment and ratio of nickel to titanium to have a target activation temperature of approximately 115° F. The actual activation temperature may have a range over approximately 10° Centigrade, wherein the range preferably includes the 115° F. target activation temperature. That is, when the nitinol strip 35 comprising sections 36a and 36b are in contact with fluid having a temperature below the preprogrammed activation temperature range, the sections are flexible enough for fluid under pressure and flowing through the valve 10 to allow plug 38 to be pushed away from the female component 16 and further into intermediate bore 27 of housing 12, as shown in FIG. 4.

When the fluid temperature increases, nitinol changes from a martensite crystal structure to an austinite crystal structure, thereby stiffening strip sections 36a and 36b, wherein the elastic modulus of the strip sections 36a and 36b changes from approximately 4×10E6 pounds per square inch, i.e., an elastic modulus similar to that of lead, to approximately 10×10E6 pounds per square inch, i.e., an elastic modulus similar to that of aluminum. The increase in stiffness due to the temperature change is sufficient to overcome the pressure of fluid flowing through the valve and cause plug 38 to mate with female component 16 for cutting off water flow, which is described in more detail below. While nitinol strip 35 having sections 36a and 36b is described as having a target activation temperature of 110° F. and a 10° Centigrade range encompassing this target temperature, other target temperatures and ranges can be acquired in a similar manner to as described above, through heat treatment or by varying the ratio of nitinol to titanium.

Plug 38, positioned between the ends 37a and 37b of nitinol strip sections 36a and 36b is preferably formed from, for example, nylon, elastomeric material, or plastic and is substantially rod-shaped having a circular cross-section, as shown in FIGS. 2a and 2b. Plug 38 includes a flange 40 against which nitinol strip 35 is adjacently positioned. Flange 40 is preferably larger in diameter than the body portion 39 of plug 38 and includes a surface 42 which extends outwardly past the circumference of body portion 39. Accordingly, fluid flow F directed towards body portion 39 and which flows over body portion 39 flows against both exposed body portion 39 and surface 42 of flange 40, thereby increasing the surface area against which fluid flow F under pressure acts on male component 14 and thereby increasing the utilization of the kinetic energy of fluid flow F for moving male component 14 away from female component 16. At the end 43 of body portion 39 opposite flange 40, body portion 39 is preferably chamfered so as to further facilitate sealable engagement with female component 16 during activation at the predetermined temperature and when fluid flow is shut off. With fluid flow F shut off, chamfered end 43 of plug 38 presses against female component 16, causing a slight interference with female component 16, and providing a preload of male component 14 against female component 16, against which the pressure of fluid flow F must overcome to allow flow through the valve. The preload is accomplished via the height h of plug 38 wherein the greater the height, the larger the preload. In addition to facilitating engagement, the chamfer on end 43 decreases the surface area against which fluid flow F most efficiently acts for moving male component 14 away from female component 16. Accordingly, maintaining the valve in the closed position, as shown in FIG. 1, against fluid flow, is further facilitated by the chamfer and the decrease of surface area on which the fluid flow F most efficiently acts. Less area is therefore subject to the fluid flowing under pressure.

Figure 3A:
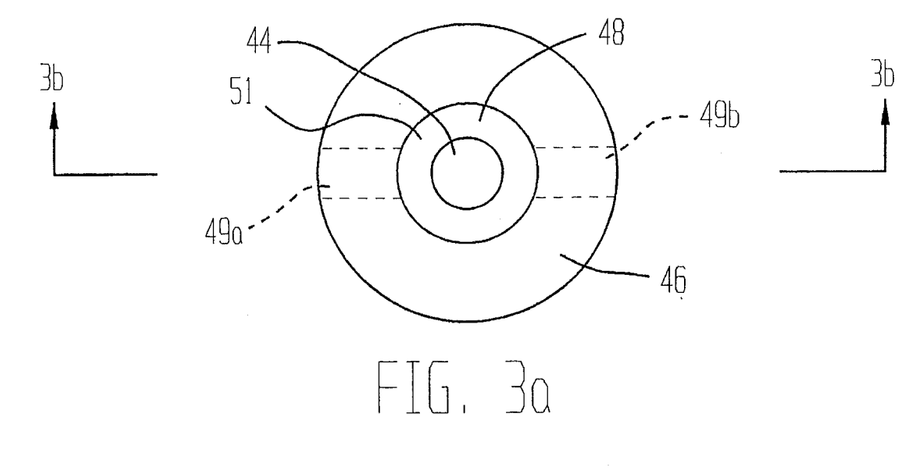
FIG. 3a is an overhead view of a female component of the present invention.
Figure 3B:
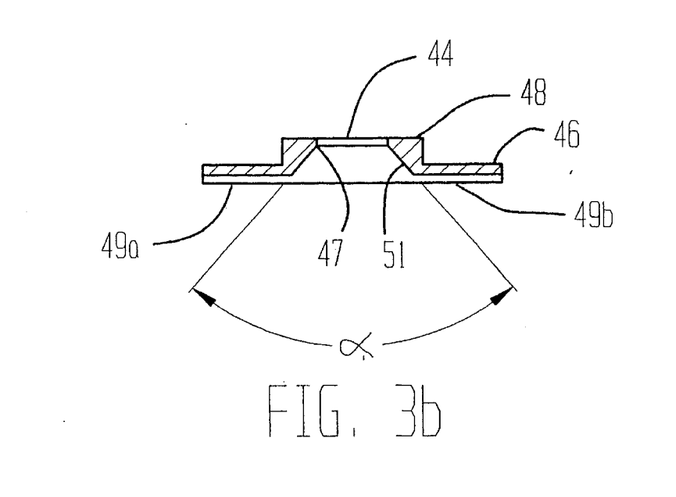

Referring to FIG. 1, female component 16 sits in first bore 22 of housing 12 against male component 14, and may preferably be formed from stamping, injection molding or machining. As shown in FIG. 3, female component 16 is preferably substantially circular in shape, having a diameter slightly less than the diameter of first bore 22 but preferably sufficient in diameter for sealably engaging first bore 22. Female component 16 includes an aperture 44 through the center thereof through which fluid flows, forming an inner edge or wall 47.

As shown in FIGS. 1 and 3, female component 16 also includes an outer substantially flat ring 46 defining the outer circumference of component 16 and a recessed area 48 in which aperture 44 is positioned. Outer ring 46 includes two rectangularly shaped recesses 49a and 49b spaced approximately 180° apart on the surface of outer ring 46. Recesses 49a and 49b are sized and shaped to receive strip sections 36a and 36b, respectively, while the valve is assembled. Accordingly, the outlet sides of strip sections 36a and 36b of strip 35 rest at their outer ends and their outer surface against step 32 of housing 12 and the inlet sides of strip sections 36a and 36b rest in rectangularly shaped recesses 49a and 49b. Recesses 49a and 49b provide clearance for strip sections 36a and 36b of strip 35 and preferably during use of the valve, strip sections 36a and 36b do not contact any portion of female component 16.

Recessed area 48 has a conical wall 51 extending to aperture 44. The angle α of conical wall 51 is such that based on the widest portion of the recess and the depth of female component 16, clearance is provided for plug 38 and the narrowest portion of conical wall 51 is sufficient for receiving plug 38 so that the surface of chamfered end 43 may engage wall 47 of aperture 44.

Accordingly, when the predetermined temperature is reached, male component 14 takes on the position shown in FIG. 1 relative female component 16 such that, with reference to FIGS. 1-3, the body portion 39 of plug 38 extends into recessed area 48 and chamfered end 43 of body portion 39 engages inner wall 47 of aperture 44. FIG. 4 is indicative of the position male component 14 takes relative to female component 16 when the predetermined temperature is not reached, thereby allowing fluid flow through the valve. In this position, strip sections 36a and 36b of strip 35 are flexible thus allowing fluid flow to push against surface 42 of flange 40 and end 43 of body 39 and move plug 38 away from aperture 44 such that chamfered end 43 is not engaged with inner wall 47 of aperture 44. Fluid flow further moves strip sections 36a and 36b of strip 35 away from rectangularly shaped recesses 49a and 49b, such that they are supported only by surface 32 of housing 12.

The valve may also include a screen 50 positioned in the inlet end 20 of first bore 22 wherein in the preferred embodiment, the screen has a conical shape and functions to remove unwanted particles from the fluid prior to exiting through outlet end 21. In addition, and in order to seal the valve, screen 50 includes a rubber washer 52 at the outer circular periphery thereof.

The entire assembly in its preferable manner of use, and as described in detail above, is held together as a functional unit preferably by its mode of attachment to a pipe or other fluid line, such as, for example, a shower pipe or faucet. That is, the assembly is screwed on or otherwise attached via housing 12 to the pipe or the like which pushes against the components of the valve, holding the components together for operation as described below.

Figure 5:
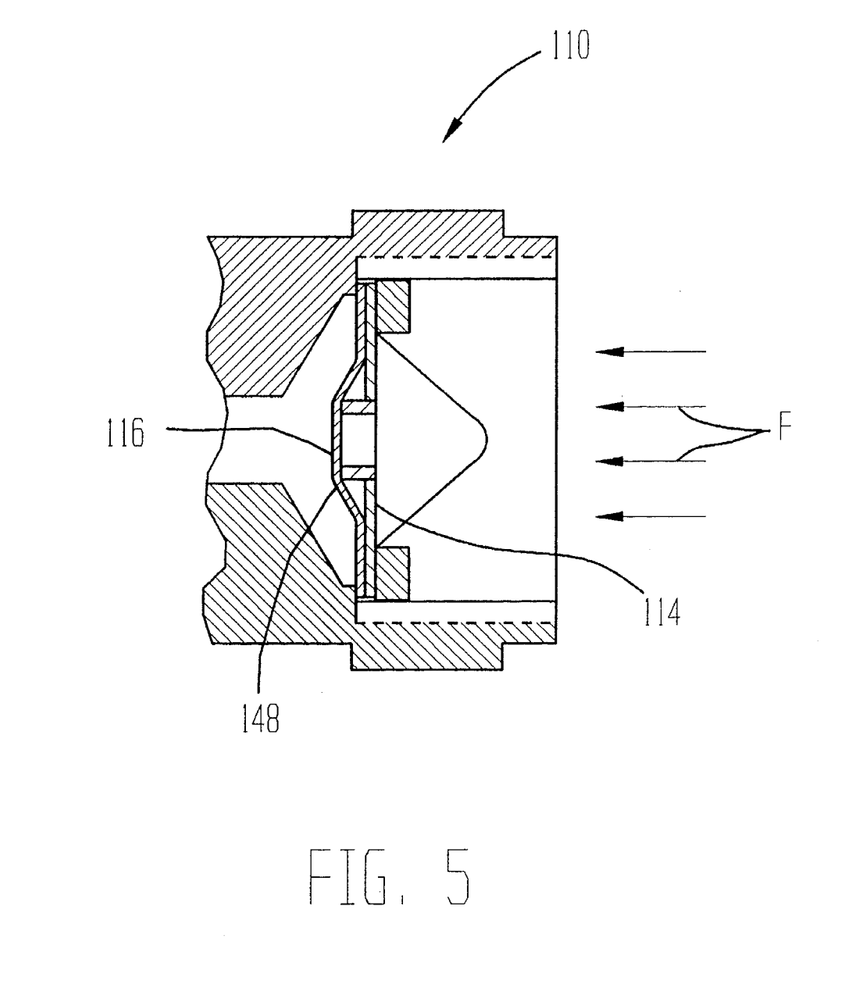
FIG. 5 is a cross-sectional view of another embodiment of the anti-scald valve of the present invention, similar to FIG. 1.
Figure 6:
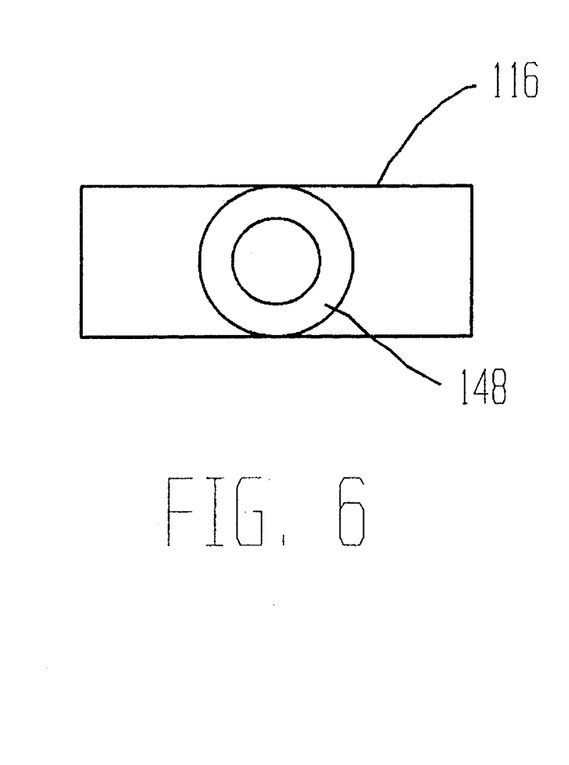
FIG. 6 is an overhead view of the female component of the valve shown in FIG. 5.
Figure 7:
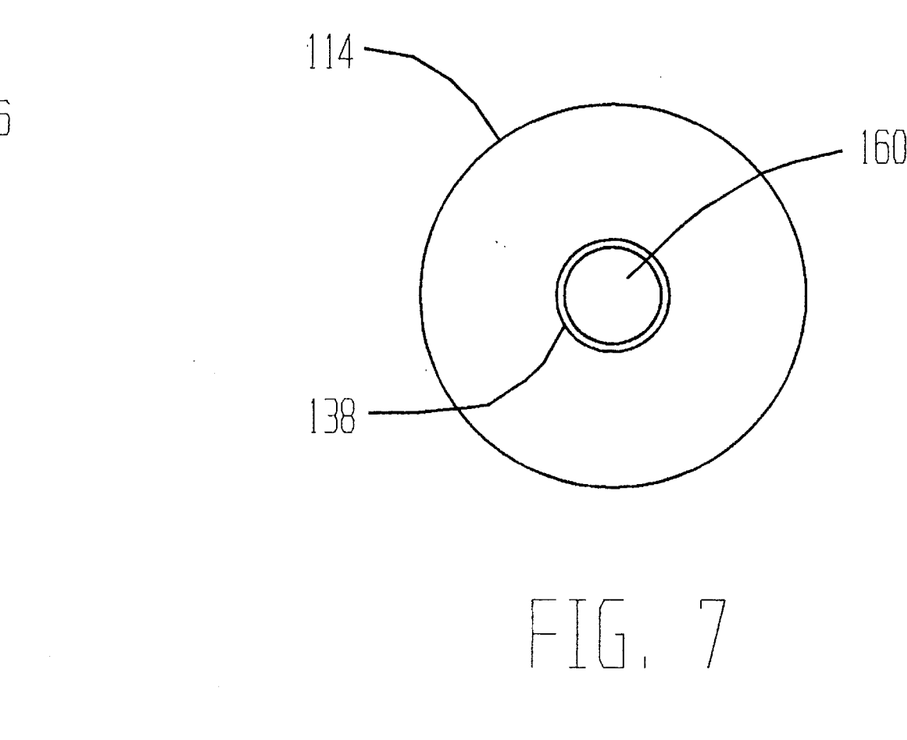
FIG. 7 is an overhead view of the male valve component for use with the valve shown in FIG. 5.
Figure 8:
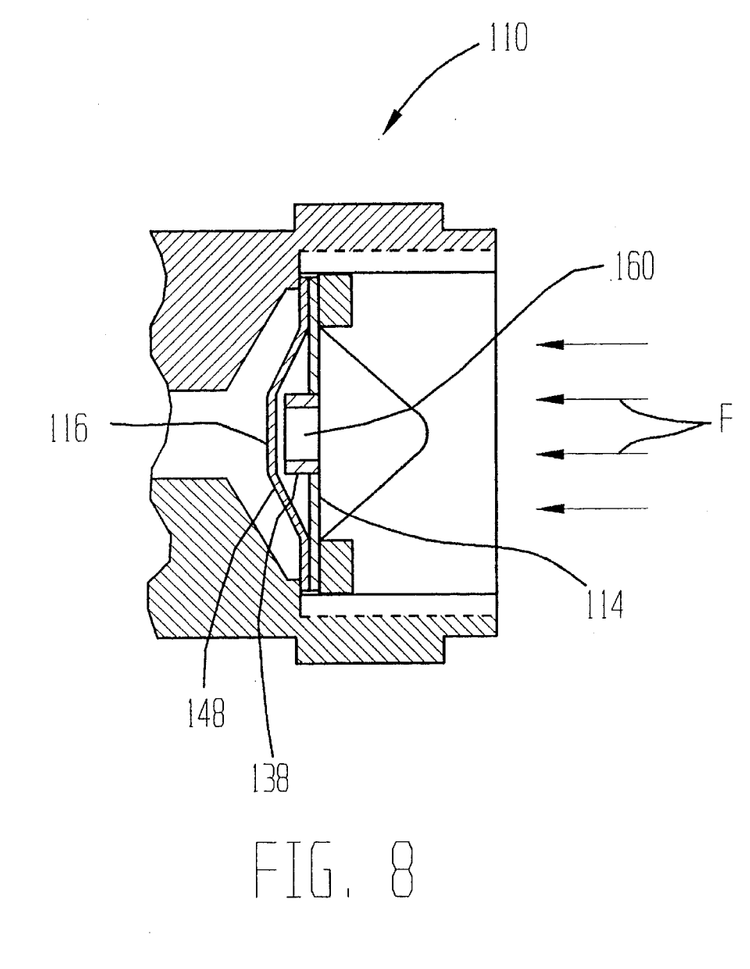
FIG. 8 is a cross-sectional view of the anti-scald valve shown in FIG. 5 but in a position allowing for fluid flow therethrough.

The above description is for but one embodiment of the present invention and many modifications can be made to this embodiment to provide alternative embodiments. For example, as shown in FIGS. 5 and 8 for valve 110, the male and female components 114 and 116, respectively can be switched in position. With respect to embodiment 110 shown in FIGS. 5–8, only the elements which are different than their respective parts shown in valve 10 are described in detail and given numerical designations, it being understood that the remaining elements of valve 110 are similar to the respective elements of valve 10. The male component 114 is preferably disc-shaped, as shown in FIG. 6 with a center plug 138 and provided with an aperture 160 and the female component is preferably strip shaped, as shown in FIG. 6 and operable to stiffen, having a recessed area 148, with a closed surface 162 operable to engage and disengage the plug 138 of the male component 114.

During operation of the valve of the present invention, when the temperature of the fluid is below the predetermined target temperature, preferably 115° F., or not within the 10° Centigrade range including the 115° F. target temperature, the valve takes on the configuration shown in FIG. 4. That is, as fluid passes through the valve via inlet end 20 and the temperature of the fluid is below the predetermined temperature, strip sections 36a and 36b of strip 35 of male component 14 are flexible under the pressure of the fluid flowing through the valve. Thus, at this stage, the strip sections 36a and 36b have an elastic modulus of approximately 4×10E6, similar to that of lead. Because of the flexibility of the strip sections, plug 38 is forced to back off from aperture 44 via the pressure of fluid flow F against flange 40 and body 39 of plug 38 and thus regular flow of water is achieved. When the temperature of the fluid is increased to the predetermined target temperature, i.e. approximately 115° F., or within the 10° Centigrade range inclusive thereof, nitinol strip sections 36a and 36b stiffen to an elastic modulus of 10×10E6, similar to the stiffness of aluminum, and due to this stiffening, the chamfered end 43 of plug 38 is preferably forced against inner wall 47 of aperture 44 stopping fluid flow. The stiffness of strip sections 36a and 36b is sufficient to overcome the pressure of the fluid flowing against male component 14 and hold plug 38 in engagement with aperture 44. Accordingly, fluid flow F is choked off for preventing accidental scalding.

The engagement of plug 38 with female component 16 may be adjusted so that the fluid flow F is cut off at various degrees of flow intensity. That is, the engagement may be adjusted, for example, to allow no fluid through the valve; a trickle of fluid through the valve; and, a minimal stream of fluid flow through the valve as well as other flow intensities. Fluid flow can be adjusted to reach these varying intensities of flow by varying the preload interference between the male component 14 and female component 16. Accordingly, referring to FIGS. 2a and 2b, this is accomplished by changing the height h of plug 38. If height h is increased, the preload, discussed above, of male component 14 and plug 38 against female component 16 is increased. Accordingly, if height h is increased, and water pressure is constant, causing plug 38 to be loaded with greater force against female component 16, the constant force of fluid flow F will fail to move plug 38 as far from aperture 44, thus not stopping fluid flow as completely. Lessening height h of plug 38 has the opposite effect.

The primary advantage of this invention is that an anti-scald valve is provided having a simple design and which is economical to manufacture and saves energy. Another advantage of this invention is that an anti-scald valve is provided which includes an element which is highly responsive and sensitive to a predetermined potentially harmful temperature so as to cut-off fluid flow upon reaching this temperature. Still another advantage of this invention is that an anti-scald valve is provided incorporating a shape memory element for cutting off water flow upon detection of a potentially harmful fluid temperature. Yet another advantage of this invention is that an anti-scald valve is provided which is easily adaptable for use with existing faucets or shower heads.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. An anti-scald valve, comprising:
   a housing including a fluid flow inlet end and a fluid flow outlet end, said housing having a longitudinal axis which extends from said inlet end to said outlet end; and
   a male valve component and a female valve component positioned in said housing between said inlet end and said outlet end, one of said female valve component and said male valve component allowing fluid flow therethrough, said male valve component including an extended portion for sealably mating with a second surface of said female valve component for cutting off fluid flow at a fluid temperature falling within a predetermined fluid temperature range, wherein said male component and said female component form a space efficient valve portion;
   wherein one of said male valve component and said female valve component includes an actuating member including means for causing said actuating member to be substantially flexible at a component temperature below said predetermined fluid temperature range for allowing fluid flow thereover and means for stiffening when said component temperature falls within said predetermined fluid temperature range for moving said extended portion and said second surface into a mating position which substantially cuts off said fluid flow for forming a valve-closed position;
   wherein said actuating member is substantially comprised of a planar member which is disposed longitudinally in a plane substantially perpendicular said longitudinal axis while said valve is in said valve closed position.

2. The anti-scald valve according to claim 1, wherein said means for stiffening comprises at least one of said first valve component and said second valve component comprising a member formed from a shape memory alloy, wherein based on the properties of said shape memory alloy, said member stiffens when said component temperature is within said predetermined fluid temperature range for moving said first surface and said second surface into said mating position and blocking said fluid flow.

3. The anti-scald valve according to claim 2, wherein said shape memory alloy is nitinol.

4. The anti-scald valve according to claim 3, wherein said support member stiffens over a temperature range of 10° centigrade based on the properties of said nitinol.

5. The anti-scald valve according to claim 3, wherein said support member formed from nitinol has an elastic modulus which ranges from substantially 4×10E6 pounds per square inch to 10×10E6 pounds per square inch.

6. The anti-scald valve according to claim 1, wherein said housing includes an opening adapted to receive said first and second valve components, and wherein said first component is positioned closer to said outlet end than said second component, said housing further including means for supporting said first component against said second component and against said fluid flow.

7. The anti-scald valve according to claim 1, wherein said fluid flow has a flow path and said first valve component is positioned between said second valve component and said housing such that at least a portion of said first valve component is always in said flow path during the operation of said valve.

8. The anti-scald valve according to claim 1, wherein said first valve component is a male valve component and said second valve component is a female valve component, and wherein at least said female valve component allows fluid flow therethrough, said second surface of said female valve component adapted to sealably receive an extended portion of said male valve component for cutting off said fluid flow when said component temperature falls within said predetermined fluid temperature range, such that said means for stiffening causes said extended portion and said first surface to be moved into said mating position.

9. The anti-scald valve according to claim 8, wherein said means for stiffening comprises at least one of said female valve component and said male valve component comprising a member formed from a shape memory alloy, wherein based on the properties of said shape memory alloy, said member stiffens when said component temperature falls within said predetermined fluid temperature range for moving said first surface and said second surface into said mating position for blocking said fluid flow.

10. The anti-scald valve according to claim 9, wherein said shape memory alloy is nitinol.

11. The anti-scald valve according to claim 8, wherein said extended portion is a plug and said second surface is a recess formed to sealably engage said plug upon forcing said recess and plug together via said stiffening of said support member.

12. The anti-scald valve according to claim 11, wherein said plug has a chamfered edge adapted to engage said recess for creating a tight seal between said plug and said recess.

13. The anti-scald valve according to claim 12, wherein said female component further includes a fluid flow opening therein.

14. The anti-scald valve according to claim 11, wherein said plug includes a flange extending outwardly beyond said body portion for increasing pressure of a body portion and said fluid flow against said plug.

15. The anti-scald valve according to claim 8, wherein said housing includes an opening adapted to receive said male and female components, and wherein said male component is positioned closer to said outlet end than said female component, said housing further including a support for supporting said male component against said female component and against said fluid flow.

16. The anti-scald valve according to claim 8, wherein said predetermined fluid temperature range spans over approximately 10° Centigrade and includes a temperature of 115° F.

17. The anti-scald valve according to claim 8, wherein said fluid flow has a flow path and said male component is positioned between said female component and said housing such that at least a portion of said male component is always in said flow path during the operation of said valve.

18. The anti-scald valve according to claim 8, wherein said male valve component comprises a strip-shaped section and said female valve component includes a strip shaped recess for receiving said strip section.

19. The anti-scald valve according to claim 9, wherein said member comprises said male valve component.

20. The anti-scald valve according to claim 8, wherein said male component includes a strip-shaped section and said extended portion comprises a center plug portion attached to said section and wherein said female component is ring shaped having a central recessed area, said second surface comprising a wall of an aperture through said recessed area, said center recessed area adapted to receive said plug portion and said plug portion adapted to substantially engage said wall for choking off fluid flow.

21. An anti-scald valve, comprising:

a housing including a fluid flow inlet end and a fluid flow outlet end; and a male valve component and a female valve component positioned in said housing between said inlet end and said outlet end, at least one of said male valve component and said female valve component allowing fluid flow therethrough, said male valve component including an extended portion for sealably mating with a second surface of said female valve component for cutting off fluid flow at a fluid temperature falling within a predetermined fluid temperature range;

wherein at least one of said male valve component and said female valve component is substantially flexible at a component temperature below said predetermined fluid temperature range for allowing fluid flow thereover and wherein at least one of said male valve component and said female valve component includes means for stiffening when said component temperature falls within said predetermined fluid temperature range for moving said extended portion and said second surface into a mating position which substantially cuts off said fluid flow; and wherein said male valve component comprises a strip-shaped section and said female valve component comprises a strip-shaped recess for receiving said strip-shaped section of said male valve component.

* * * * *